US011586662B2

(12) United States Patent
Meyerzon et al.

(10) Patent No.: US 11,586,662 B2
(45) Date of Patent: Feb. 21, 2023

(54) EXTRACTING AND SURFACING TOPIC DESCRIPTIONS FROM REGIONALLY SEPARATED DATA STORES

(71) Applicant: MICROSOFT TECHNOLOGY LICENSING, LLC, Redmond, WA (US)

(72) Inventors: Dmitriy Meyerzon, Bellevue, WA (US); Nikita Voronkov, Bothell, WA (US); Vladimir Gvozdev, Sammamish, WA (US); Kaixiang Miao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 157 days.

(21) Appl. No.: 17/210,414

(22) Filed: Mar. 23, 2021

(65) Prior Publication Data

US 2022/0284052 A1    Sep. 8, 2022

Related U.S. Application Data

(60) Provisional application No. 63/157,430, filed on Mar. 5, 2021.

(51) Int. Cl.
*G06F 7/00* (2006.01)
*G06F 16/387* (2019.01)
(Continued)

(52) U.S. Cl.
CPC .......... *G06F 16/387* (2019.01); *G06F 16/313* (2019.01); *G06F 16/35* (2019.01); *G06N 5/022* (2013.01); *G06N 20/00* (2019.01)

(58) Field of Classification Search
CPC ...... G06F 16/387; G06F 16/313; G06F 16/35; G06F 16/258; G06F 16/196;
(Continued)

(56) References Cited

U.S. PATENT DOCUMENTS 7,890,452 B2   2/2011   Moore et al.
7,987,152 B1   7/2011   Gadir et al.
(Continued)

OTHER PUBLICATIONS

Kulkarni, et al., "Document Allocation Policies for Selective Searching of Distributed Indexes", In Proceedings of the 19th ACM International Conference on Information and Knowledge Management, Oct. 26, 2010, pp. 449-458.
(Continued)

*Primary Examiner* — Mohammad A Sana
(74) *Attorney, Agent, or Firm* — Jacob P. Rohwer; Newport IP, LLC

(57) ABSTRACT

Extracting and surfacing information corresponding to individual logical topics from enterprise data stores that are separated across multiple geographic regions. A clustering service creates, by utilizing machine learning toolkits that are agnostic to the region in which data is stored, individual topics that have references to multiple shards of data that are stored in different geographic regions. The clustering service also shards the knowledge base state according to the regions from which pieces of data for the particular logical topic was extracted. For example, a first shard containing information extracted from a first document may be stored in a first region whereas a second shard containing information extracted from a second document may be stored in a second region. Responsive to user activity associated with the topic, a serving platform may identify and reconstitute these shards that are stored in different regions so as to surface the regionally extracted and sharded information on that topic to a user.

20 Claims, 7 Drawing Sheets

(51) Int. Cl.
    *G06F 16/31*     (2019.01)
    *G06N 5/022*     (2023.01)
    *G06N 20/00*     (2019.01)
    *G06F 16/35*     (2019.01)

(58) Field of Classification Search
CPC .. G06F 16/164; G06F 16/211; G06F 16/2365; G06F 16/2379; G06N 20/00; G06N 5/022
See application file for complete search history.

(56) References Cited

U.S. PATENT DOCUMENTS

| | | | |
|---|---|---|---|
| 10,740,396 | B2 | 8/2020 | Aswani et al. |
| 2012/0209853 | A1 | 8/2012 | Desai et al. |
| 2018/0300385 | A1 | 10/2018 | Merriman et al. |
| 2019/0332662 | A1* | 10/2019 | Middendorf .......... G06F 16/258 |
| 2020/0042885 | A1* | 2/2020 | Zhong ................... G06N 5/022 |
| 2021/0250744 | A1* | 8/2021 | Kang .................... H04W 76/16 |
| 2022/0292106 | A1* | 9/2022 | Umay ................... G06F 16/258 |

OTHER PUBLICATIONS

"International Search Report and Written Opinion Issued in PCT Application No. PCT/US22/017444", dated Jul. 8, 2022, 11 Pages.

"Enrich Machine Learning with Unified Data from a Knowledge Graph", Retrieved from: https://web.archive.org/web/20200930213319/https://www.stardog.com/platform/features/graph-machine-learning/, Sep. 30, 2020, 7 Pages.

Aslett, Matt, "Stardog Rocks on with Improved Performance for Data Unification", Retrieved from: https://www.stardog.com/img/451%20Research-Stardog-rocks-on-with-improved-performance-for-data-unification.pdf, Aug. 15, 2019, 4 Pages.

Clark, Kendall, "Create your Digital Twin with an Enterprise Knowledge Graph", Retrieved from: https://www.stardog.com/blog/create-your-digital-twin-with-an-enterprise-knowledge-graph/, Jul. 27, 2020, 11 Pages.

Galkin, et al., "Enterprise Knowledge Graphs: A Semantic Approach for Knowledge Management in the Next Generation of Enterprise Information Systems", In Proceedings of the 19th International Conference on Enterprise Information Systems, vol. 2, Jan. 2017, pp. 88-98.

Masuch, Lukas, "Enterprise Knowledge Graph—One Graph to Connect Them All", Retrieved from: https://www.managementexchange.com/hack/enterprise-knowledge-graph-one-graph-connect-them-all, Mar. 28, 2014, 16 Pages.

Sullivan, Danny, "A Reintroduction to our Knowledge Graph and Knowledge Panels", Retrieved from: https://blog.google/products/search/about-knowledge-graph-and-knowledge-panels/, May 20, 2020, 8 Pages.

\* cited by examiner

EXTRACTING AND SURFACING TOPIC DESCRIPTIONS FROM REGIONALLY SEPARATED DATA STORES

PRIORITY APPLICATION

This application claims the benefit of and priority to U.S. provisional application No. 63/157,430, filed Mar. 5, 2021, entitled "Extracting And Surfacing Topic Descriptions From Regionally Separated Data Stores," the entire contents of which are incorporated herein by reference.

BACKGROUND

Maintaining and disseminating enterprise knowledge is a challenging process faced by modern enterprises. A typical process for maintaining enterprise knowledge may include extracting relevant information from a vast array of different enterprise data sources. The extracted information may then be compiled into suitable format such as a knowledge graph that is usable to surface information as appropriate to recipients across an entire enterprise. A knowledge graph may include a set of topics and corresponding topic descriptions. In some instances, the topic descriptions for a particular topic within the knowledge graph may be generated by compiling pieces of information that are extracted from multiple different enterprise data sources. A serving platform may later serve content from the knowledge graph to users of the enterprise in response to certain types of user activity. For example, the serving platform may respond to a query related to a specific topic by obtaining information on that topic from the knowledge graph and surfacing the information to the user via a user interface.

Some modern enterprises are global in nature and have offices located in multiple different regions of the world. Such global enterprises often have multiple enterprise data sources that are located across these different regions. As a result, processes for maintaining and disseminating enterprise knowledge that are deployed by such global enterprises typically must comply with data sovereignty principles. For example, data is typically subject to the laws and governance structures of the nation within which it is collected. Thus, data that is extracted from some of an enterprises data sources may be subject to different laws than other data that is extracted from other enterprises data sources located in a different region.

It is with respect to these and other considerations that the disclosure made herein is presented.

SUMMARY

Technologies described herein provide systems and methods that facilitate extracting and surfacing information corresponding to individual logical topics from enterprise data stores that are separated across multiple geographic regions. Generally described, embodiments described herein deploy a clustering service to create, within a knowledge base, individual topics that have references to multiple shards of data that are stored in different geographic regions. For example, a first document stored in a first region and a second document stored in a second region may each contain information associated with a particular logical topic (e.g., a particular enterprise project, a specific person, etc.). A clustering service may analyze extracts of the information from these two documents to output a knowledge base state that defines a state of the data clustering for an entire enterprise. The clustering service may also shard the knowledge base state according to the regions from which pieces of data for the particular logical topic was extracted. For example, a first shard containing information extracted from the first document may be stored in the first region whereas a second shard containing information extracted from the second document may be stored in the second region. Then, responsive to user activity associated with the topic, a serving platform may reference the knowledge base state to identify and reconstitute these shards that are stored in different regions so as to surface the regionally extracted and sharded information on that topic to a user.

In this way, embodiments described herein facilitate geographically specific data extraction and data storage (enabling ridged and precise adherence to data sovereignty principles), while concurrently facilitating geographically agnostic topic surfacing to an enterprise's user base. For example, users across an entire enterprise may be presented with identical information related to a particular topic regardless of which region they are located, even when such information is extracted from and maintained in sharded form across multiple regionally separated data stores. This is because the shards are stored within whatever region their underlying data is obtained and then reconstituted at query time for surfacing to a user.

Furthermore, as described in more detail below, some embodiments described herein further facilitate automatically updating a knowledge base state and migrating corresponding shards to accommodate for migration of enterprise data sources from one region to another—without re-extracting and re-clustering the enterprise's data. For example, in response to a determination that a tenant site (e.g., a SharePoint Site or Exchange Mailbox) has been moved from a particular region to a different region, shards of the knowledge base state that were generated from data stored in association with the tenant site may be read from the particular region and re-sharded according to the different region to which the tenant site has been moved.

In an exemplary implementation, a system may deploy one or more data mining toolkits to analyze enterprise data that is stored across multiple geographic regions. This analysis by the data mining toolkit(s) may result in information about a particular logical topic being extracted from each of a first document that is stored in a first region and a second document that is stored in a second region. Individual extracts that are generated by the toolkit(s) and are associated with the particular logical topic may be written to object stores that correspond to the region from which the underlying data was obtained. Thus, a first extract from the first document would be stored in the first region and a second extract from the second document would be stored in the second region.

A clustering service may then analyze the extracts generated by the data mining toolkit(s) to output a knowledge base state that defines a state of the data clustering across the entire enterprise. For example, the clustering service may generate and/or define relationships and/or linkages between multiple extracts that each relate to the particular logical topic and are stored in different regions of the world. The relationships and/or linkages between extracts may in some instances form a cohesive synopsis related to the particular logical topic such as, for example, a topic description.

The clustering service may also shard the knowledge base state according to the regions from which extracts associated with the particular logical topic were generated. For example, the clustering service may create a first shard based on an extract obtained from the first document and a second shard based on another extract obtained from the second document. Each of these shards may be referenced within the knowledge base state in relation to the particular logical topic while being stored in whichever region the data contained in that shard was extracted by the mining toolkit (s).

Then, responsive to user activity associated with the particular logical object, a serving platform may reference the knowledge base state to identify and then reconstitute shards that each correspond to the particular logical object and that are stored across multiple regions. For example, under circumstances in which the clustering service relates multiple shards that are stored in different regions together to form a cohesive topic description or summary for the particular logical topic, the serving platform may identify and reconstitute these shards together at query time to present users across the entire enterprise with the same information in a regionally agnostic manner, even though the shards corresponding to the particular logical topic are stored in a regionally specific manner based on where extracted or mined data is initially obtained.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for maintaining multiple shards of information that each correspond to an individual logical topic in multiple regionally separated data stores and then at query time reconstituting the shards to surface the reconstituted information to a user. Generally described, embodiments described herein deploy a clustering service to create logical topics within a knowledge base. Individual ones of the logical topics may have references to multiple shards of data that are stored in different geographic regions. As a specific example, a first document that is stored in a first data store at first region and a second document that is stored in a second data store at a second region may each contain some information associated with a particular logical topic. Mining toolkits may mine each of the first and second data stores to generate a first data extract and a second data extract from the first document and the second document, respectively. Each of these two data extracts may contain information describing the particular logical topic. A clustering service may analyze the data extracts to output a knowledge base state that defines a state of the data clustering for an entire enterprise. The clustering service may also shard the knowledge base state according to the regions from which pieces of data for the particular logical topic was extracted (e.g., according to the regions in which the underlying extracts were mined). For example, the knowledge base state may be comprised of a first shard corresponding to the first data extract that is stored in the first region and a second shard corresponding to the second data extract that is stored in the second region. Then, a serving platform may respond to user activity associated with the topic by referencing the knowledge base state to identify and reconstitute these two shards that are stored in different regions so as to surface the regionally extracted and sharded information on that topic to a user.

Figure 1:
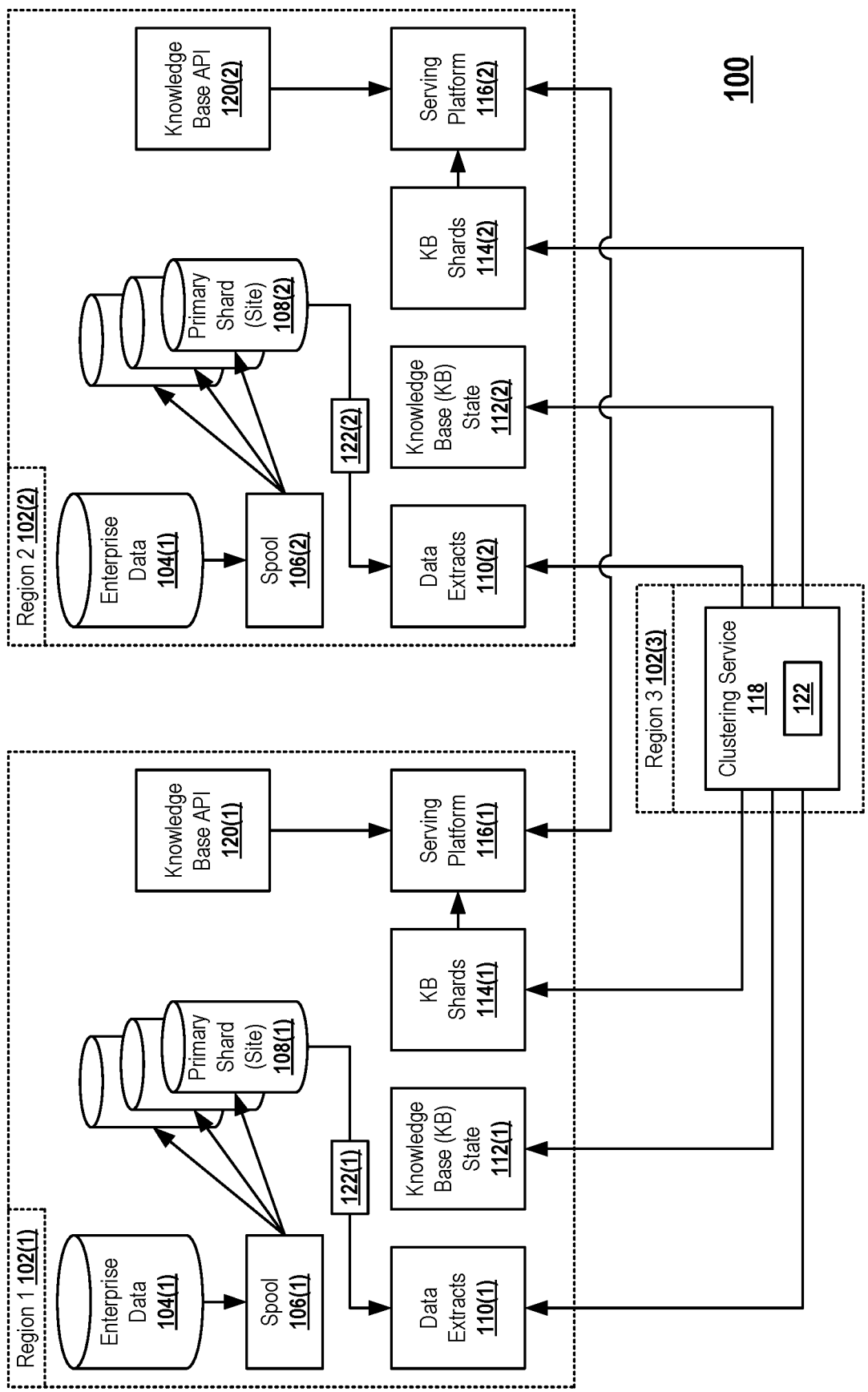
FIG. 1 illustrates an exemplary computing environment in which knowledge base (KB) shards that contain information associated with a KB state are stored across multiple regions.

Turning now to FIG. 1, illustrated is an exemplary computing environment 100 in which knowledge base (KB) shards 114 that contain information associated with a KB state 112 are stored across multiple regions 102. As illustrated, the computing environment 100 includes a first region 102(1) at which first enterprise data 104(1) is stored and a second region 102(2) at which second enterprise data 104(2) is stored. As further illustrated, the computing environment 100 further includes a clustering service 118 that operates within a third region 102(3) and is in communication (e.g., via one or more networks) with various computing resources within each of the first region 102(1) and the second region 102(2). In some instances, the third region 102(3) may be a home region of the enterprise.

The enterprise data 104 that is stored in the different regions 102 may include various enterprise-specific data sources that are selectively available to groups of predefined users within an enterprise (e.g., web-based collaboration platforms shared by groups of users within a specific department or region), and/or user-specific data sources (e.g., an email and/or online data storage that uniquely corresponds to an individual user account). Accordingly, the enterprise data 102 may include email account data that includes electronic messages that are stored in association with individual users' email accounts (e.g., Microsoft® Outlook® accounts), business communication platform data that includes messages and/or documents that are accessible via multiple user accounts (e.g., Microsoft® Teams® accounts, Microsoft® Yammer® accounts), and other forms of enterprise-specific data, which may be proprietary to the enterprise (e.g., not publicly available). In some instances, the enterprise data 102 may further include non-proprietary data that is publicly available to non-enterprise persons (e.g., public websites generated and/or hosted by an enterprise).

In some embodiments, the enterprise data 104 that is stored within any particular region 102 may be accessible by a replication service 106 that reads the enterprise data 104 and selectively pushes the portions of the enterprise data 104 into a series of primary shards 108 (which may be referred to herein as site shards). Here, a first replication service 106(1) operates within the first region 102(1) to sort some or all of the first enterprise data 104(1) into a first set of primary shards 108(1) and a second replication service 106(2) operates within the second region 102(2) to sort some or all of the second enterprise data 104(2) into a second set of primary shards 108(2). In some instances, individual ones of the primary shards 108 may be data hosting sites (e.g., a Microsoft SharePoint site) and/or mailboxes (e.g., a Microsoft Exchange mailbox). In this context, individual primary shards 108 may or may not correspond uniquely to individual user accounts. Thus, individual instances of enterprise data that are written into a particular primary shard 108 may be compiled from multiple different data sources that are maintained at each region in association with multiple different user accounts. For example, instances of data (e.g., email messages, word processing documents, etc.) that are replicated into any particular primary shard 108 may be read from one or more user-specific email accounts, user-specific file hosting sites (e.g., Microsoft SharePoint, Microsoft OneDrive, etc.) that are accessible via a single set of user credentials, shared file hosting sites that are accessible via multiple different sets of user credentials, and/or publicly available information such as a public facing internet website that is hosted by the enterprise.

In some embodiments, one or more mining platforms 122 may analyze the primary shards 108 that are generated within each region 102 to generate data extracts 110 within the corresponding region 102. For example, as illustrated, first data extracts 110(1) may be generated, based on the first set of primary shards 108(1), and then stored within an object store at the first region 102(1). Similarly, second data extracts 110(2) may be generated, based on the second set of primary shards 108(2), and then stored within another object store at the second region 102(2). In this way, individual data extracts 110 that are mined within a particular region 102 remain stored within that particular region 102. In some embodiments, a mining platform 122 may operate in a designated region (e.g., the home or default region for a tenant) to perform data mining across the regions in a geographically agnostic manner (e.g., remotely from one or more regions 102 that are storing data that is being mined). In this way, the geographic distribution of data is transparent to the mining platform and, therefore, both the input to the one or more mining toolkits and the output from the one or more mining toolkits. For example, a mining platform 122 may operate within the third region 102(3) to mine primary shards 108 for any particular region 102 and to write data extracts 110 generated via the mining processes back to an object store at that particular region 102. In some embodiments, a mining platform 122 operates within each individual region 122 (e.g., a first mining platform 122(1) may operate within the first region 102(1) and a second mining platform 122(2) may operate within the second region 102(2)). In this way, data mining computing processes may occur within the individual regions 102 at which corresponding primary shards 108 and data extracts 110 are generated and stored.

In some embodiments, the mining platform(s) deploy one or more machine learning (ML) models that are configured to identify topics from within a corpus, which in the illustrated embodiment is comprised of the primary shards 108. For example, the ML models may identify acronyms that are referenced within individual documents of the corpus, project names referenced and described in enterprise documentation, and various other notable topics that are relevant to the enterprise from which the corpus is obtained. Additionally, or alternatively, the ML models may extract topic descriptions corresponding to these identified topics. An exemplary such ML model may be a natural language processing (NLP) model that is configured to identify a category of individual sentences and/or groups of sentences within the set of documents that make up the corpus. Exemplary categories include, but are not limited to, authoritative definitions for identified topics, information associated with identified topics, and opinions regarding identified topics.

Exemplary such ML models may include, but are not limited to, a Bidirectional Encoder Representations from Transformers (BERT) model that is configured to perform transformer-based ML techniques to extract different types of topics descriptions. Exemplary such topic descriptions may include, but not limited to, single line definitions, multiline definitions, and topic summarizations compiled from single or multiple discrete data sources. For example, a BERT model may be deployed to identify candidate topic descriptions from the various sets of primary shards 108, that are stored across multiple different regions, and then to rank the candidate topic descriptions based on enterprise-specific signals indicating a level of importance of individual candidate topic descriptions with respect to a particular enterprise. Exemplary such enterprise signals include, but are not limited to, a seniority level of one or more authors of individual topic descriptions, indications of whether author(s) of individual topic descriptions have assigned workloads that correspond or relate to the corresponding topics, and levels of dissemination of individual topic descriptions across an enterprise. In some implementations, these enterprise-specific signals are generated by way of supervised learning techniques. By utilizing the enterprise-specific signals, the ML model(s) are enabled to identify topic descriptions that are uniquely relevant to a specific enterprise and to further rank these identified topic descriptions at an organizational level (i.e., in a manner that is uniquely appropriate to an individual enterprise). As described herein, the disclosed techniques facilitate extraction and clustering of information that is captured from multiple discrete data sources that are stored at different geographic regions into single logical topics and/or single topic descriptions. Additionally, the disclosed techniques facilitate these single logical topics and/or single topic descriptions being sharded across the regions from which the information is extracted so as to ensure regionally specific data storage and regionally agnostic data surfacing.

As illustrated, a clustering service 118 may execute one or more mining toolkits (also described in relation to the mining platform 122) to generate the data extracts 110 and to output a knowledge base (KB) state 112, a subset of which is translated into user visible topics which are output as the KB shards 114. Generally described, the KB state 112 defines a state of the data clustering across the entire enterprise. In the illustrated embodiment, the clustering service 118 operates within the third region 102(3) (e.g., the home region) to reason across a current KB state and both of: (i) the first data extracts 110(1) that are stored within the first region 102(1), and (ii) the second data extracts 110(2) that are stored within the second region 102(2). In doing so, the clustering service 122 may update the current KB state as an enterprise's data evolves by generating and/or defining relationships and/or linkages between multiple newly generated data extracts 110 that each relate to a particular logical topic and are stored in different regions 102 across the globe. For example, linkages may be defined between one or more of the first data extracts 110(1) and one or more of the second data extracts 110(2) in relation to a particular single logical topic (e.g., a specific person, a specific project or product being developed by the enterprise) so as to compile discrete aspects of information into a cohesive topic description for the single logical topic. In other words, the relationships and/or linkages between data extracts 110 may in some instances form a cohesive synopsis related to the particular logical topic such as, for example, a topic description that is richer and more complete than could be formed via single data extracts 110 within a single region 102.

Instances of the KB state 112 may be written to and maintained within data stores at each region 102 and/or some subset of the regions 102. As illustrated, a first instance 112(1) of the KB state is stored within the first region 102(1) and a second instance 112(2) of the KB state is stored within the second region 102(2). Although the illustrated computing environment 100 is shown to include data extracts 110 within only two discrete and geographically separated regions 102, it should be appreciated that the exemplary computing environment 100 may include more than two regions 102 similar to those illustrated in FIG. 1. In an exemplary embodiment, the KB state 112 may define an enterprise-wide knowledge graph that includes references to information that is generated and/or maintained in the multiple different regions 102. In this way, an enterprise-wide knowledge graph may be generated without violating data sovereignty rules and principles that uniquely correspond to the different regions 102 within which various sub-portions of the enterprise's data is stored. For example, if each of the first region 102(1) and second region 102(2) are located within nations that require data generated therein to be stored therein, the techniques described herein enable the clustering service 118 to reason across the enterprise data that is being stored within each respective region (in accordance with whatever data sovereignty laws and/or regulations are applicable) to generate the enterprise-wide knowledge graph without violating region-specific data laws and/or regulations and, in some instances, without even having knowledge or information of where individual portions of the enterprise's corpus are stored.

The clustering service 118 may also generate KB shards 114 in association with the KB state 112 in a manner such that individual ones of the KB shards 114 are generated and stored according to the particular regions 102 from which data extracts 110 underlying the KB shards 114 are generated and/or maintained. Thus, under circumstances in which information associated with a single logical topic is compiled into the KB state 112 (e.g., an enterprise-specific knowledge graph) from the first data extracts 110(1) and the second data extracts 110(2), one or more of the first KB shards 114(1) in addition to one or more of the second KB shards 114(2) may all correspond to the single logical topic within the KB state 112. For example, the one or more of the first KB shards 114(1) may form a part of a topic description for the single logical topic whereas the one or more of the second KB shards 114(2) may form another part of the topic description for the single logical topic. Thus, a single logical topic and/or topic description thereof within an enterprise-specific knowledge graph may be comprised of multiple discrete pieces of information that are extracted from and stored within their respective regions of original generation. In this example, reconstituting the one or more of the first KB shards 114(1) and the one or more of the second KB shards 114(2) may be performed to reconstruct the single logical topic and/or topic description into a relatively more cohesive form than is present within either of the first or second KB shards 114. In various embodiments, the KB shards 114 are used to store the subset of the KB state which is to be presented to the user whereas the KB state 112 stores similar or corresponding data in format that is internal to and readable by the one more mining toolkits. Furthermore, in some embodiments, each of the KB state 112 and the KB shards 114 are geographically sharded in a similar fashion so that any information contained within either of the KB state and/or KB shards is exclusively retained within the region that is storing site shards that support such information.

In some embodiments, one or more serving platforms 116 may be operated within individual ones of the regions 102. For example, in the computing environment 100 a first serving platform 116(1) is being operated within the first region 102(1) and a second serving platform 116(2) is being operated within the second region 102(2). In response to user activity that occurs within any individual region 102, a corresponding serving platform 116 may reference the KB state 112 to identify multiple KB shards 114 that exist across multiple regions 102 in association with a particular logical topic. Then, the serving platform 116 may reconstitute the identified shards to reconstruct the single logical topic and/or topic description thereof and, ultimately, to surface (e.g., expose, present, or otherwise communicate) the reconstituted single logical topic and/or topic description thereof to a user. For example, suppose that a user enters a query for a particular logical topic (e.g., a code name for an enterprise project) via a knowledge base (KB) application programing interface (API) 120 at a particular region 102. Here, the corresponding serving platform 116 may respond to the query by looking the particular logical topic up within the KB state 112 to identify one or more of the first KB shards 114(1) and one or more of the second KB shards 114(2) that were clustered together or otherwise related/interlinked (e.g., by the clustering service 118) to form a single cohesive topic description for the particular logical topic.

In this way, the computing environment 100 facilitates geographically specific data extraction and data storage (enabling ridged and precise adherence to data sovereignty principles corresponding to whichever region data is generated and/or maintained), while concurrently facilitating geographically agnostic topic surfacing to an enterprise's user base and to the Artificial Intelligence based mining toolkits. For example, the serving platform(s) will surface the same reconstituted result to each of: (i) a first user that submits a first query within the first region 102(1) for a particular logical topic, and (ii) a second user that submits a second query within the second region 102(1) for that same logical topic—even under circumstances in which the shards corresponding to the this logical topic are stored in a regionally specific manner based on where extracted or mined data is initially obtained.

In various implementations the corpus may be a tenant-wide corpus that corresponds to multiple different user accounts that are individually and/or collectively provided with access to various aspects of the enterprise computing resources enterprise data 104. That is, the corpus that is mined by the mining platform 122 (e.g., the primary shards 108) may be comprised of documents and/or data objects that are compiled from a multitude of different users' email accounts, online "cloud-based" file storage, internally published documents that are accessible by all enterprise users and/or subsets of users defined by username and/or directory attributes, and so on. In such implementations, topics and/or topic descriptions thereof may be selectively exposed to individual recipients based on an access control list (ACL). For example, under circumstances in which multiple different topic descriptions have been extracted for a particular topic, then the serving platform 116 may select only from the subset of these multiple different topic descriptions which have been extracted from sources which the ACL permits a particular recipient access to.

Figure 2:
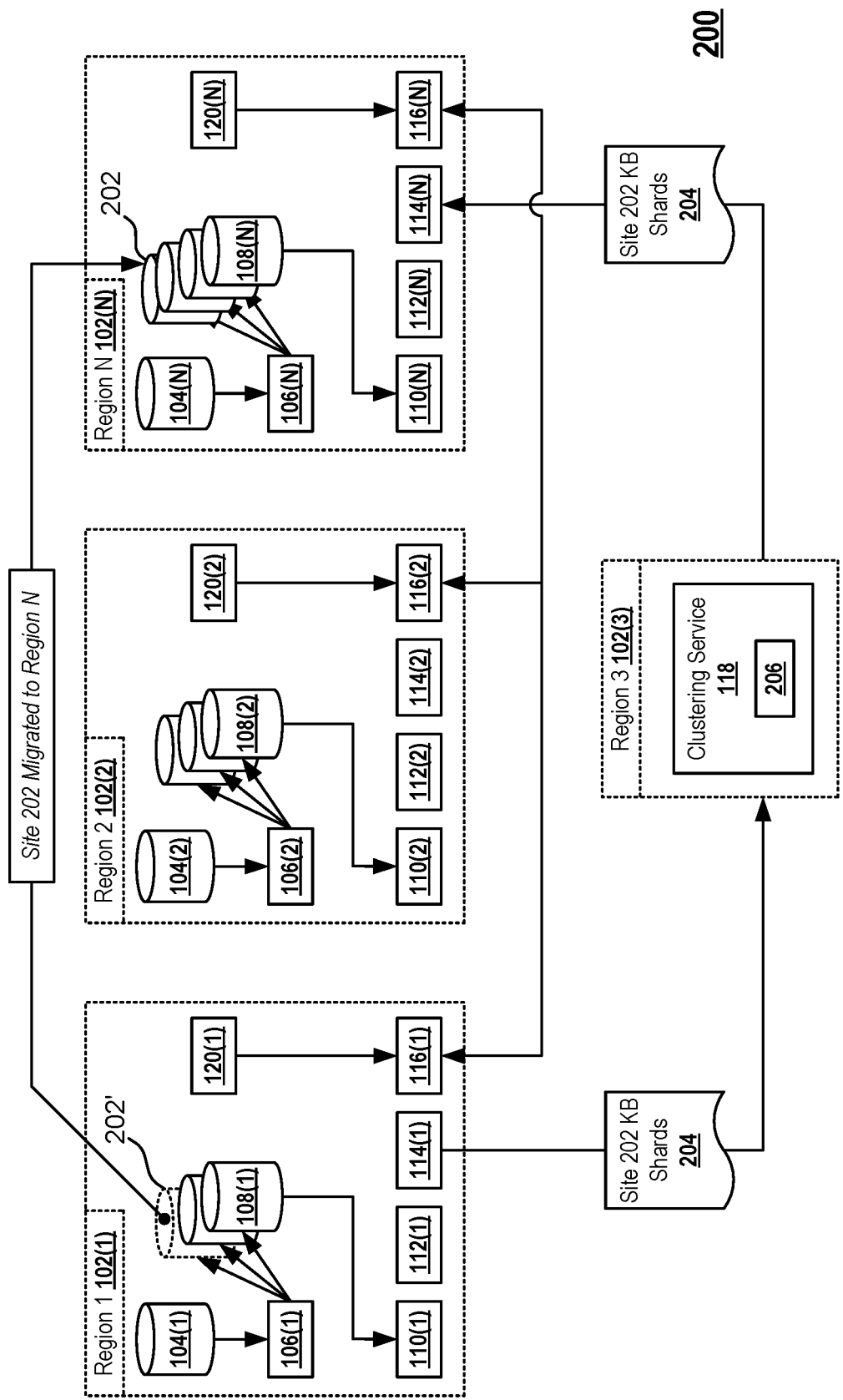
FIG. 2 illustrates an exemplary computing environment in which KB shards corresponding to a particular site are automatically migrated responsive to a site migration of the particular site.

Turning now to FIG. 2, illustrated is an exemplary computing environment 200 in which knowledge base (KB) shards 114 corresponding to a particular site 202 are automatically migrated responsive to a site migration of the particular site 202. As illustrated, the computing environment 200 includes a first region 102(1) that, at a first time, is configured to support the particular site 202. Specifically, the first region 102(1) may include one or more servers that at the first time operate the particular site 202 which may be, for example, a file hosting site (e.g., a Microsoft SharePoint site) and/or a mailbox (e.g., a Microsoft Exchange mailbox). In some embodiments, the particular site 202 may serve as a primary shard 108 that serves as a convenient storage location from which the mining platform 122 may obtain the data extracts 110.

Under a variety of circumstances for modern computing architectures that hosted enterprise tenants, data stores associated with any particular tenant are dynamic in nature in the sense that individual data stores may periodically be migrated between numerous different regions 102. For example, in response to certain trigger events, a particular file hosting site and/or mailbox may be migrated from one region to another region. As a specific but non-limiting example, an enterprise tenant may have multiple first data stores such as Microsoft SharePoint sites operating in North America and multiple second sites operating in Europe. Then, depending on factors such as load balancing, an individual site of the first data stores may be migrated from North America to Europe. That is, the individual site may be read from the first data stores operating in North America and written into the second data stores operating in Europe. Then, the individual site may be decommissioned from the first data stores to complete the migration of the individual site between regions.

In the illustrated example, the particular site 202 is shown to be migrated from the first region 102(1) to an Nth region 102(N). Thus, while the first region 102(1) is configured to support the particular site 202 at the first time, at a second time (after the migration) the Nth region 102(N) is configured to support the particular site 202 and the first region 102(1) is no longer configured to support the particular site 202. To graphically convey this migration, the particular site 202 is shown in dashed-line form and labeled as prime 202' with respect to the first region 102(1) and is shown in solid-line form and labeled 202 with respect to the Nth region 102(N).

In some embodiments, the clustering service 118 is configured to monitor the various regions 102 associated with any particular enterprise tenant to detect site migrations as shown in FIG. 2. For example, the clustering service 118 may continually and/or periodically audit the enterprise data 104 and/or primary shards 108 corresponding to the individual regions 102 associated with a particular enterprise tenant. Furthermore, the clustering service 118 may maintain a site-region map 206 that serves as a mapping between sites and regions 102. Thus, in the illustrated example, the site-region map 206 would at the first time associate a particular site identifier for the particular site 202 with a first region identifier for the first region 102(1). Then, at the second time after the particular site 202 has successfully been migrated from the first region 102(1) to the Nth region 102(N), the clustering service 118 may detect that the particular site 202 is no longer being operating by the computing resources within the first region 102(1) and is now being operated by other computing resources within the Nth region 102(N).

In response to detecting that the particular site 202 has been migrated as shown, the clustering service 118 may identify a shard subset 204 of the first KB shards 114(1) that correspond to the particular site 202. For example, individual ones of the KB shards 114 may include an identification of the specific underlying data sources from which the information contained therein was extracted. Such identifications may identify the specific data extracts 110 and/or primary shards 108 from which the clustering service 118 has previously generated specific KB shards 114. Thus, even subsequent to generating the KB state 112 and the KB shards 114, the clustering service 118 may retain an ability to identify which KB shards 114 were generated based on specifically identifiable data/information that is stored in association with the particular site 202. As illustrated, responsive to the migration of the particular site 202 from the first region 102(1) to the Nth region 102(N), the clustering service 118 may read the shard subset 204 from the first KB shards 114(1) and write the shard subset 204 to the Nth KB shards 114(N). Additionally, or alternatively, responsive to the migration of the particular site 202 from the first region 102(1) to the Nth region 102(N), the clustering service 118 may read the first KB state instance 112(1) and write the first KB state instance 112(1) to the Nth region 102(N).

In this way, the shard subset 204 that has been generated based on information extracted from the particular site 202 remains stored within whichever region 102 the particular site 202 is currently stored and/or operated within. Furthermore, since the migration of the particular site 202 from the first region 102(1) to the Nth region 102(N) does not change the data associated with the particular site 202 but rather merely changes the physical machines on which that data is stored, according to some implementations the migration of the particular site 202 does not serve as a triggering event that justifies reperforming the computationally expensive data mining operations that were previously performed by the mining platform 122 and/or the clustering operations previously performed by the clustering service 118. Instead, the shard subset 204 may simply be migrated from the first KB shards 114(1) into the Nth KB shards 114(N) to cause: (i) the first KB shards 114(1) to include data that has been extracted from whichever sites and/or primary shards 108 are currently stored within the first region 102(1), and (ii) the Nth KB shards 114(N) to include data that has been extracted from whichever sites and/or primary shards 108 are currently stored within the Nth region 102(N). In this way, the clustering service 118 dynamically adjusts the manner in which an enterprise's KB shards 114 are regionally sharded in response to site migrations occurring—without incurring the expense of re-extracting and re-clustering data obtained from those sites and/or primary shards 108 undergoing migration. Additionally, the KB state the first KB state instance 112(1) may be migrated from the first region 102(1) to the Nth region 102(N).

The clustering service 118 may also update the site-region map 206 in response to detecting that the particular site 202 has been migrated from the first region 102(1) to the Nth region 102(N). For example, as noted above, at the first time when the particular site 202 is being operated by the computing resources within the first region 102(1) the site-region map 206 associates the particular site identifier for the particular site 202 with a first region identifier for the first region 102(1). Then, responsive to detecting the site migration as shown and/or transferring the shard subset to the Nth region 102(N), the clustering service 118 may update the site-region map 206 to by overwriting the association of the particular site identifier with the first region identifier with a new association of the particular site identifier with an Nth region identifier for the Nth region 102(N).

Figure 3:
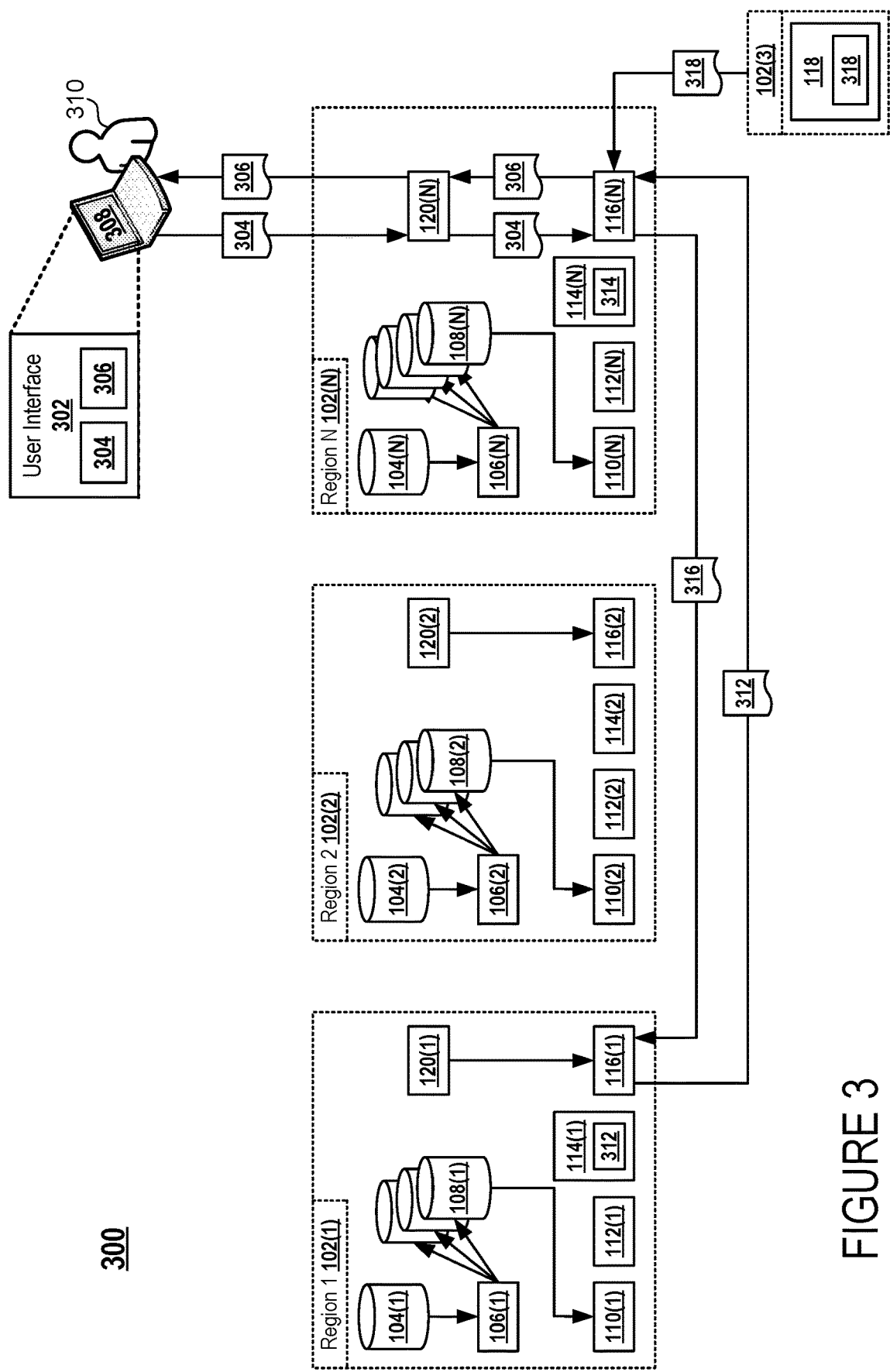
FIG. 3 illustrates an exemplary computing environment in which user activity that occurs in association with a particular region results in a serving-platform reconstituting KB shards that are stored across multiple regions into a reconstituted topic.

Turning now to FIG. 3, illustrated is an exemplary computing environment 300 in which user activity 304 that occurs in association with a particular region 102 results in a serving platform 116 reconstituting KB shards 114 that are stored across multiple regions 102 into a reconstituted topic 306. As illustrated, the user activity 304 may occur via a user interface 302 that is being rendered by a user device 308 that corresponds to a particular user 310. Exemplary user activity 304 may include the particular user 310 entering a search query for a particular topic (e.g., a project name, a person, etc.) via the user interface 302. As another example, the user activity 304 may include the particular user 310 accessing a document such as an email and/or word processing file that includes a reference to the particular topic.

As described above, KB shards 114 associated with the particular topic may be sharded across multiple different regions 102 according to where the data within the KB shards 114 is currently stored. For purposes of FIG. 3, presume that the topic 306 has been generated by the clustering service 118 based on first data within the first primary shards 108(1) and second data within the Nth primary shards 108(N). Further presume that none of second data within the second primary shards 108(2) has been relied upon by the clustering service 118 to generate the topic 306. Accordingly, as illustrated, a shard subset 312 that corresponds to the topic 306 is shown as being stored within the first KB shards 114(1) and a shard subset 314 that also corresponds to the topic 306 is shown as being stored within the Nth KB shards 114(N). In some implementations, neither of the shard subset 312 nor the shard subset 314 contain all of the information comprising the topic 306 and, therefore, at query time reconstitution of these shards may be performed to regenerate the topic 306 in its entirety for surfacing to the user 310 via the user interface 302.

As illustrated, the user activity 304 is transmitted from the user device 308 to an Nth KB API 120(N) that is executing within the Nth region 102(N). For example, the user 310 may be operating the user device 308 within an enterprise campus that physically resides within the Nth region 102(N). The Nth KB API 120(N) then relays the user activity 304 (or aspects thereof such a topic identifier) to the Nth serving platform 116(N) which may then reference the Nth KB state 112(N) to look up the topic 306. In some embodiments, looking up the topic 306 within the KB state 112 informs the Nth serving platform 116(N) which specific KB shards 114 are needed to reconstitute the topic 306 into cohesive form.

Under some circumstances such as those illustrated in FIG. 3, the set of KB shards 114 that are needed to reconstitute the topic 306 may reside across multiple different region 102. For example, as illustrated, each of the shard subset 312 and the shard subset 314 are necessary in order to reconstitute the topic 306. Furthermore, in some embodiments one or more regions 102 might not be currently storing any KB shards 114 that are necessary in order to reconstitute the topic 306. In the present example, none of the second KB shards 114(2) are associated with and/or necessary for reconstituting the topic 306. Accordingly, by referencing a topic-region map 318 which is generate at clustering time, to identify which KB shards 114 are needed to reconstitute the topic 306, the Nth serving platform 116(N) may then reference the topic-region map 318 to identify the specific regions 102 at which the specific KB shards 114 that are identified as being needed to reconstitute the topic 306 are currently being stored. Thus, in the present example, reference to the Nth KB state 112(B) and/or the topic-region map 318 (which may be stored at some or all of the regions 102) informs both that: (i) the Nth serving platform 116(N) that the shard subset 312 and the shard subset 314 are each need to reconstitute the topic 306, and (ii) the shard subset 312 is currently being stored within the first KB shards 114(1) at the first region 102(1) and the shard subset 314 is currently being stored within the Nth KB shards 114(N) at the Nth region 102(N).

Accordingly, the Nth serving platform 116(N) transmits at least one region-specific query 316 that requests a specific shard subset. For example, the region-specific query 316 may include shard identifiers that uniquely identify each of the shards within the shard subset 312. In response to the region-specific query 316, the shard subset 312 is transmitted from the first region 102(1) to the Nth serving platform 116(N) at the Nth region 102(N). Furthermore, the Nth serving platform 116(N) obtains the shard subset 314 directly from the Nth KB shards 114(N) within the Nth region 102(N).

Upon obtaining the shard subsets 312 and 314, the Nth serving platform 116(N) then reconstitutes the topic 306. The reconstituted topic 306 is then transmitted to the user device 308 via the Nth KB API 120(N). Ultimately, the reconstituted topic 306 is surfaced to the user 310 via the user interface 302. In this way, the techniques described herein prevent the serving platforms 116 from unnecessarily transmitting queries to regions 102 which do not currently contain any KB shards 114 needed to reconstitute a particular topic of interest.

In some embodiments, the Nth serving platform 116(N) may obtain the topic-region map 318 from the clustering service 118. For example, responsive to the user activity 304, the Nth serving platform 116(N) may query the clustering service 118 for the topic-region map 318 in order to identify which shard subsets are needed to reconstitute the topic 306 and/or to determine which particular regions 102 are currently storing such KB shards 114. In some instances, the topic-region map 318 may store various fields of information in a hashed form. For example, the clustering service 118 may utilize a bloom filter to convert names of individual topics within the topic-region map 318 into hashes. In this way, the names of individual topics may remain stored within particular regions 102 even though the topic-region map 318 is stored at and/or accessible by other regions. Such implementations may be useful in situations where the topic-region map 318 itself contains information that is governed by regional data sovereignty laws and/or regulations. For example, a scenario in which a topic name is confidential to a specific region and/or is required by regional laws to be stored exclusively within a particular region.

Figure 4:
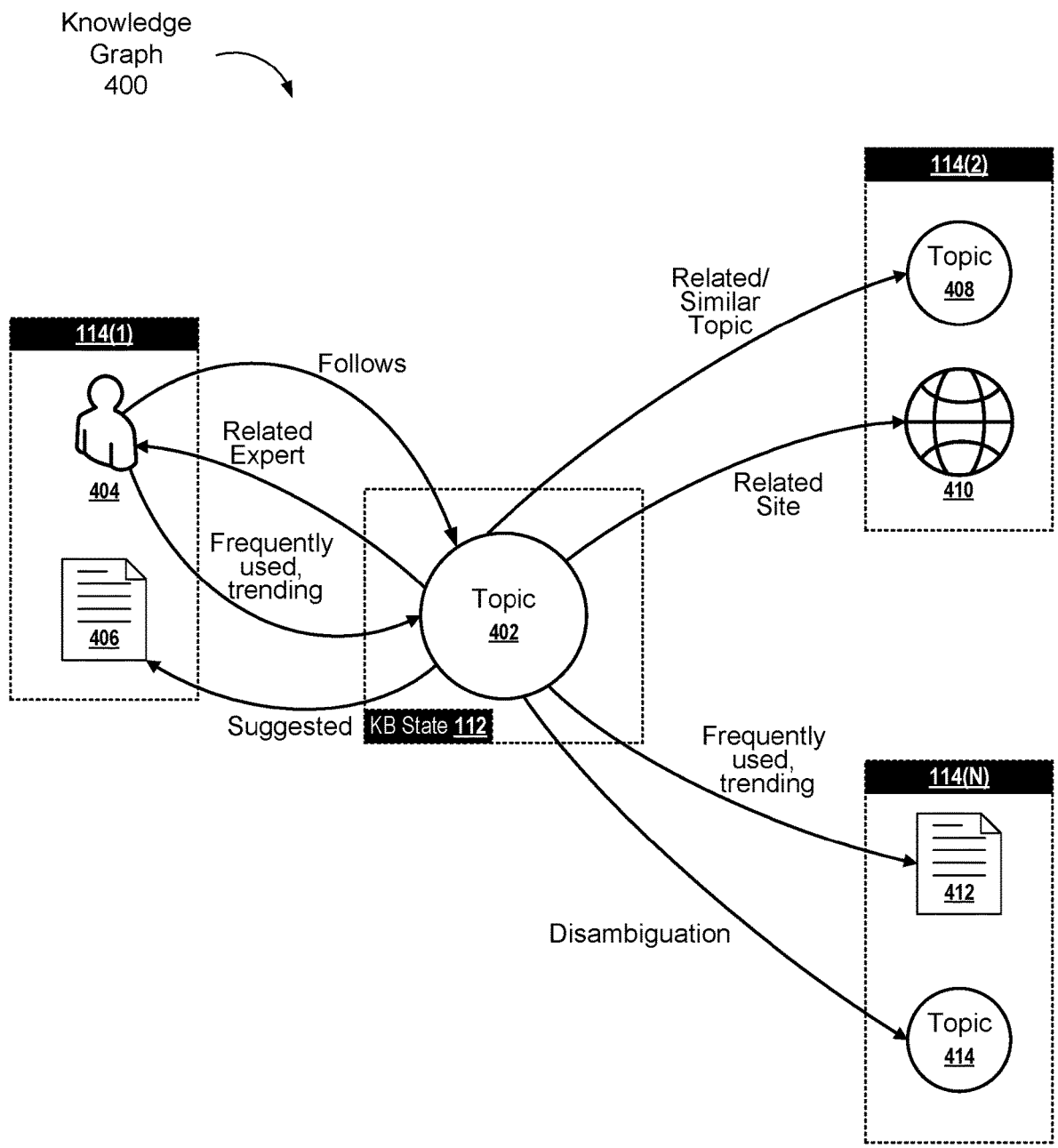
FIG. 4 illustrates an example KB state is illustrated in the form of a knowledge graph that includes a topic that is comprised of information that is stored across a plurality of sets of KB shards.

Referring now to FIG. 4, an example KB state 112 is illustrated in the form of a knowledge graph 400 that includes a topic 402 that is comprised of information that is stored across a plurality of sets of KB shards 114. As described above, these sets of KB shards 114 may be stored across multiple different geographically separated regions. As illustrated, knowledge graph 400 defines entities 402-414 and relationships between the entities. In an implementation, each entity is represented by an entity record that includes attributes that describe the entity. For example, an attribute can store an attribute value or a link to another entity that is related to the entity. A schema for an entity type defines the attributes of the entity.

As illustrated, the example knowledge graph 400 is a partial knowledge graph including relationships and/or interlinkages between the entities 404-414 and the topic 402. For example, the knowledge graph 400 links the topic 402 to each of information 404 associated with a user account and a document 406. As illustrated, each of the information 404 and the document 406 are included within the first KB shards 114(1). Here, the user account is linked to the topic 402 as an expert in relation to the topic 402, as a resource that is frequently used in association with the topic 402, and as a person that follows the topic 402. The document 406 is related to the topic 402 as a suggestion to access in relation to (e.g., to learn more about) the topic 402. As further illustrated, the knowledge graph 400 links the topic 402 to each of another topic 408 that is related to the topic 402, and a site 410 that is related to the topic 402. Here, information that is extracted from each of the topic 408 and the site 410 are stored in the second KB shards 114(2). The knowledge graph 400 further links the topic to KB shards 114(N) that have been generated based on data that is extracted from another document 412 and another topic 414 that is a disambiguation to the topic 402.

Figure 5:
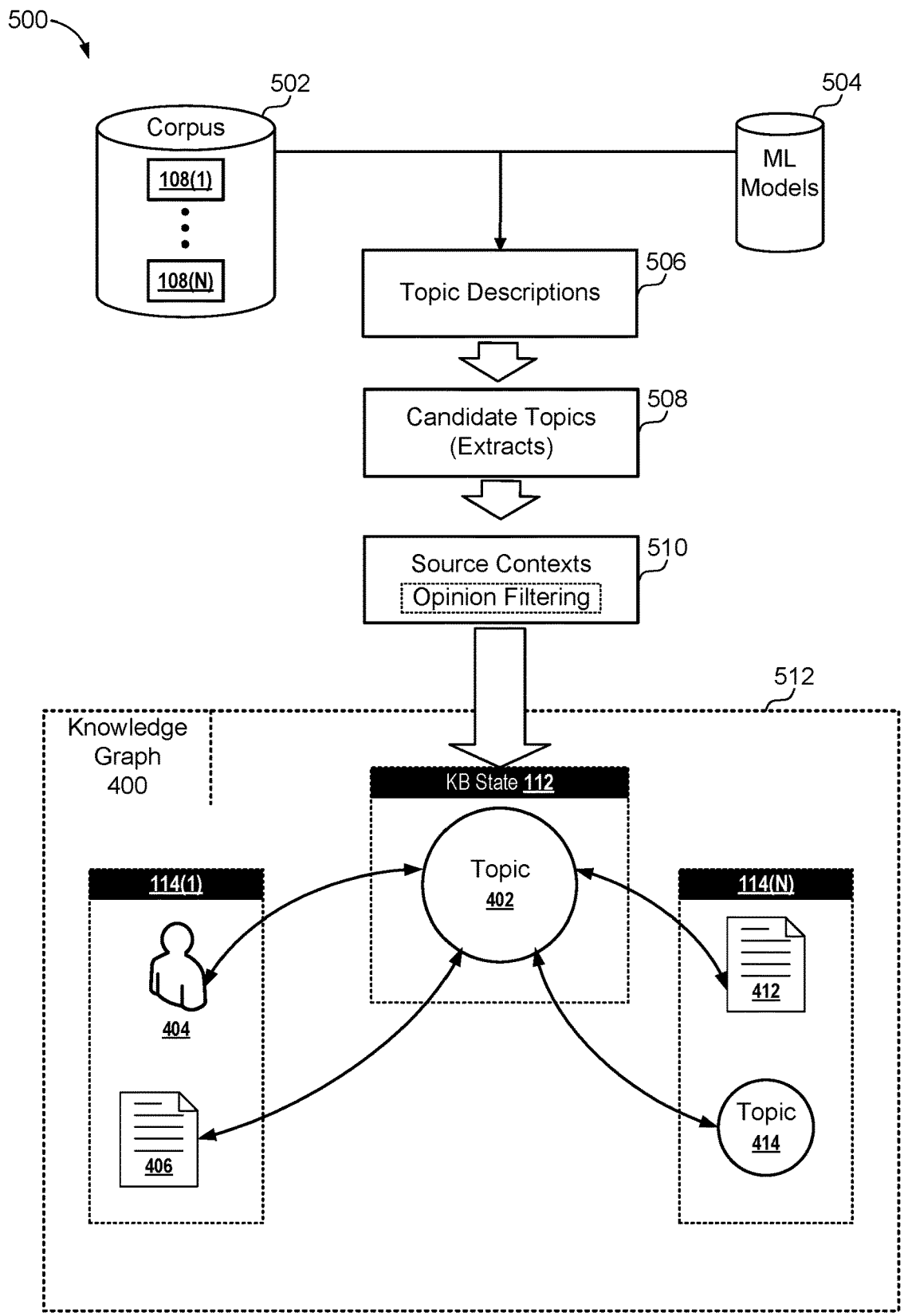
FIG. 5 illustrates an exemplary mining process in which one or more ML models may be used to analyze a corpus based on topic templates to extract a topic.

Turning to FIG. 5, illustrated is an exemplary mining process 500 in which one or more ML models 504 may be used to analyze a corpus 502 based on topic templates to extract a topic 402. In some instances, the extracted topic 402 is added to a KB state 112 in the form of an enterprise knowledge graph 400 that interlinks topics and/or topic descriptions based on source contexts and/or other suitable criteria. The corpus 502 may include vast amount of enterprise-specific, user-specific, and/or public information in the form of unstructured text. In an exemplary implementation, the corpus 502 includes primary shards 108 that are stored across the various regions 102 described herein. As described herein, the extracted topic 402 and/or topic descriptions that are mined may be seamlessly delivered to recipients via the various systems or computing resources that are commonly utilized within an enterprise ecosystem (e.g., productivity suite applications such as those provided via the Microsoft® Office 365® productivity suite applications).

In various implementations, the mining process 500 may be performed for a particular topic type such as a project. Individual topic types may be defined by one or more schema. A project is an example of a topic 402 for which a topic description may be generated via various NLP techniques. Other topic types include, but are not limited to, person names, products, services, or any other topic type suitable for various topic modeling techniques (e.g., cascaded Linear Discriminant Analysis (CLDA) classifier, Nonnegative Matrix Factorization (NMF), and/or transformer-based models such as BERT). In some implementations, individual topic descriptions may be included in the knowledge graph 400. In general terms, the mining process 500 may use topic templates identify candidate topic names and generate extracts corresponding to the candidate topic names. In some implementations, the topic templates may include text or other formatted data with placeholders to insert formatted values of properties of the individual candidate topics. The topic templates may include many templates per topic type. Individual topic templates may be applied to various windows or snippets of text from the corpus 502 that can contain single or multi-word entity type.

The mining process 500 may include operation 506 for extracting topic descriptions from the corpus 502 based on the one or more ML models 504 as described herein. As described below, candidate topics or "terms" may be identified from within these extracted topic descriptions. In some implementations, the ML models 504 deployed at operation 506 may include various NLP understanding models that have been specifically developed for definition mining. In one exemplary embodiment, the ML models 504 include a BERT model that has been specifically configured to perform a definition classification task, and which has been further distilled by training the bidirectional LSTM model using the probability logits obtained from BERT. Exemplary topic descriptions which may be extracted from the corpus 502 based on the ML models 504 may fall into various categories or labels that include, but are not limited to, definition, non-definition, informational, person-definition, and referential. For purposes of the present disclosure, the categories or labels of topic descriptions may be defined as follows:

An extracted topic description may be labeled as a "definition" if it refers clearly to the term and can uniquely define only that term. If it does not already appear as such, the extracted topic description may be rephrased into the form of "X is a Y and no other term Z could be defined using Y." In this sense, an exemplary definition type topic description of the topic "statistics" may be: statistics is a branch of mathematics dealing with data collection, organization, analysis, interpretation and presentation.

An extracted topic description may be labeled as "information" if it provides information or context related to a topic but yet cannot uniquely define the topic. In this sense, an exemplary information type topic description of the topic "statistics" may be: statistics is a branch of mathematics.

An extracted topic description may be labeled as "person-definition" if it provides information related to the name of a person. In this sense, an exemplary person-definition type topic description of the topic (and in this case name) "Peter Clark" may be: Peter Clark is a Senior Associate at CEA with broad experience in technical, political, and legal analysis on air pollution issues.

An extracted topic description may be labeled as "referential" if it is within a definition but contain an explicit term usage instance of the topic but does contain a reference to the topic. In this sense, an exemplary referential type topic description may be: This method is used to identifying a hyperplane which separates a positive class from the negative class.

An extracted topic description may be labeled as "non-definition" if it provides information or context related to a topic but does not fall into any of the aforementioned labels. In this sense, an exemplary non-definition type topic description may be: The Caterpillar 797B is the biggest car I've ever seen.

The mining process 500 may further include operation 508 for identifying candidate topics (e.g., terms) from within the extracted topic descriptions. In some implementations, the operation 506 corresponds to the use of rule-based term extractor that is applied to the topic descriptions extracted at operation 506. Generally described, a rule-based term extractor may be configured to identify terms (e.g., topics) from which the topic descriptions. In some implementations, the rule-based term extractor may be based on a hypothesis that substantially all definition sentences include a finite and identifiable number and/or type of verb phrases. Exemplary such verb phrases may include, but are not necessarily limited to, "is defined as," "means," and "is a." The rule-based term extractor may be further based on a hypothesis that the subject term or topic of such definition sentences occurs in the left side of these verb phrase patterns. For example, the sentence "statistics is a branch of mathematics dealing with data collection, organization, analysis, interpretation and presentation" includes the topic "statistics" on the left side of the verb phrase pattern "is a" which is then followed by a definition type topic description corresponding to the topic.

The mining process 500 may further include operation 510 for determining source contexts associated with the topic descriptions. For example, the operation 510 may include determining an author and/or authors associated with individual topic descriptions. In some implementations, an identified source context may include an authoritative status of a person(s) who authored one or more topic descriptions, dissemination levels of individual topic descriptions across user accounts and/or the enterprise computing resources, attributes of source documents from which the topic descriptions are extracted, and so on.

As illustrated in FIG. 3, in some embodiments the operation 510 may include opinion filtering. It can be appreciated for example that in some cases topic descriptions that are extracted from the corpus 502 may have an element of opinion. As it may be undesirable for opinions contained within individual topic descriptions to impart bias on recipients, in some implementation topic descriptions which are identified as having an element of opinion may be filtered out (e.g., removed/discarded) and/or flagged as being opinion in nature.

The mining process 500 may further include operation 512 at which the extracted topic and/or topic description thereof is added to the knowledge graph 400 with reference to KB shards 114 that are distributed across multiple regions 102. As illustrated, the knowledge graph 400 may define various interlinking relationships between the topic 402 and one or more individual KB shards 114 which may be backed by information that is stored in the same region of the individual KB shards. Exemplary interlinking relationships may include, for example, related experts, frequently used together, similar, disambiguation, and so on. As described above (e.g., in relation to FIG. 3), at query time a serving platform 116 may selectively query whichever regions 102 are currently storing KB shards 114 related to the topic 402. Then, the serving platform 116 may reconstitute the KB shards 114 for the topic 402 and surface the reconstituted topic 402 to the user.

Figure 6:
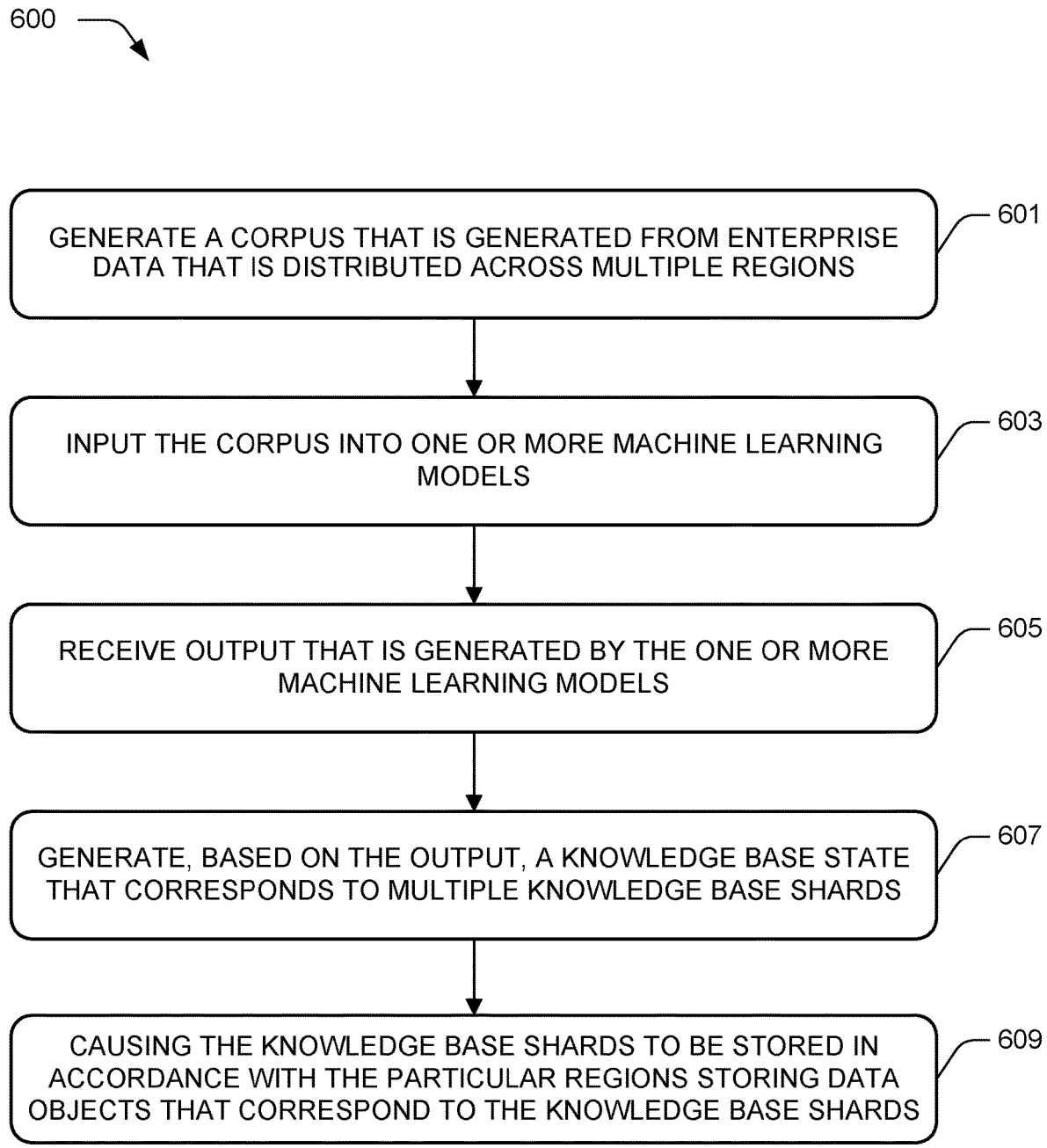
FIG. 6 is a flow diagram of an exemplary process for causing individual KB shards, that correspond to a KB state, to be stored in accordance with the particular regions that are currently storing data objects that correspond to the individual KB shards.

FIG. 6 is a flow diagram of illustrative processes 600 which is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, illustrated is a flow diagram of an exemplary process 600 for causing individual knowledge base shards, that correspond to a knowledge base state, to be stored in accordance with the particular regions that are currently storing data objects that correspond to the individual knowledge base shards. For example, if a first KB shard is generated based on information that has been extracted from a data object that is currently stored within a first region, then this first KB shard will be caused to be store within this first region.

At block 601, a system generates a corpus from enterprise data that is distributed across multiple regions. For example, corpus may include first data that is stored within a first region and second data that is stored within a second region.

At block 603, the system inputs the corpus into one or more machine learning models. The one or more machine learning models may be configured to extract a plurality of topic descriptions from the corpus. For example, a topic description related to a particular topic may be extracted and then the particular topic may be parsed from the extracted topic description based on a rule-based term extractor. Additionally, or alternatively, one or more machine learning models may be configured to generate a ranked listing of the plurality of topic descriptions based on one or more source contexts that are associated with individual topic descriptions of the plurality of topic descriptions. For example, the topic descriptions may be ranked based on authoritative statuses of a person(s) who authored one or more topic descriptions, dissemination levels of individual topic descriptions across user accounts and/or the enterprise computing resources, attributes of source documents from which the topic descriptions are extracted, and so on. Regarding dissemination levels of individual topic descriptions, the individual topic description may be placed/ranked within the ranked listing based on a degree to which the individual topic description has been distributed to individual user accounts within an enterprise. For example, a topic description that is extracted from a widely published document may be ranked higher than another topic description that is extracted from a different document that is shared with only a few people or resides exclusively within an individual user's private data.

At block 605, the system receives an output that is generated by the one or more machine learning models. The output may correspond to the KB state and, therefore, may include a plurality of extracted topic descriptions and corresponding topic terms that are parsed from the topic descriptions by a rule-based term extractor. Additionally, or alternatively, the output may include a ranked listing of the plurality of extracted topic descriptions. Generally described, the ranked listing may indicate a relative priority for exposing individual topic descriptions over other topic descriptions. Additionally, or alternatively, the output may indications of underlying source contexts of documents from which the plurality of extracted topic descriptions have been extracted. Exemplary topics may include, but are not limited to, related files, sites, people, and content such as messages gathered from various suitable messaging platforms (e.g., email, Yammer, Teams, etc.).

At block 607, the system may distill the KB state to a user visible KB entity. Thus, it should be appreciated that the system may generate each of a KB state and a user visible KB—each of which may be sharded according to region. The KB state and/or the user-visible KB may correspond to a plurality of KB shards as described herein. For example, the KB state may correspond to a first KB shard that includes information that has been extracted from the first data that is stored within a first region and a second KB shard that includes other information that has been extracted from the second data that is stored within a second region.

At block 609, the system may cause individual KB shards to be stored in the specific regions that the information underlying the individual KB shards is currently stored. For example, the system may cause: (i) the first KB shard to be stored within the first region as a result of the information within the first KB shard having been extracted from the first data that is stored within a first region, and (ii) the second KB shard to be stored within the second region as a result of the information within the second KB shard having been extracted from the second first data that is stored within a second region.

Figure 7:
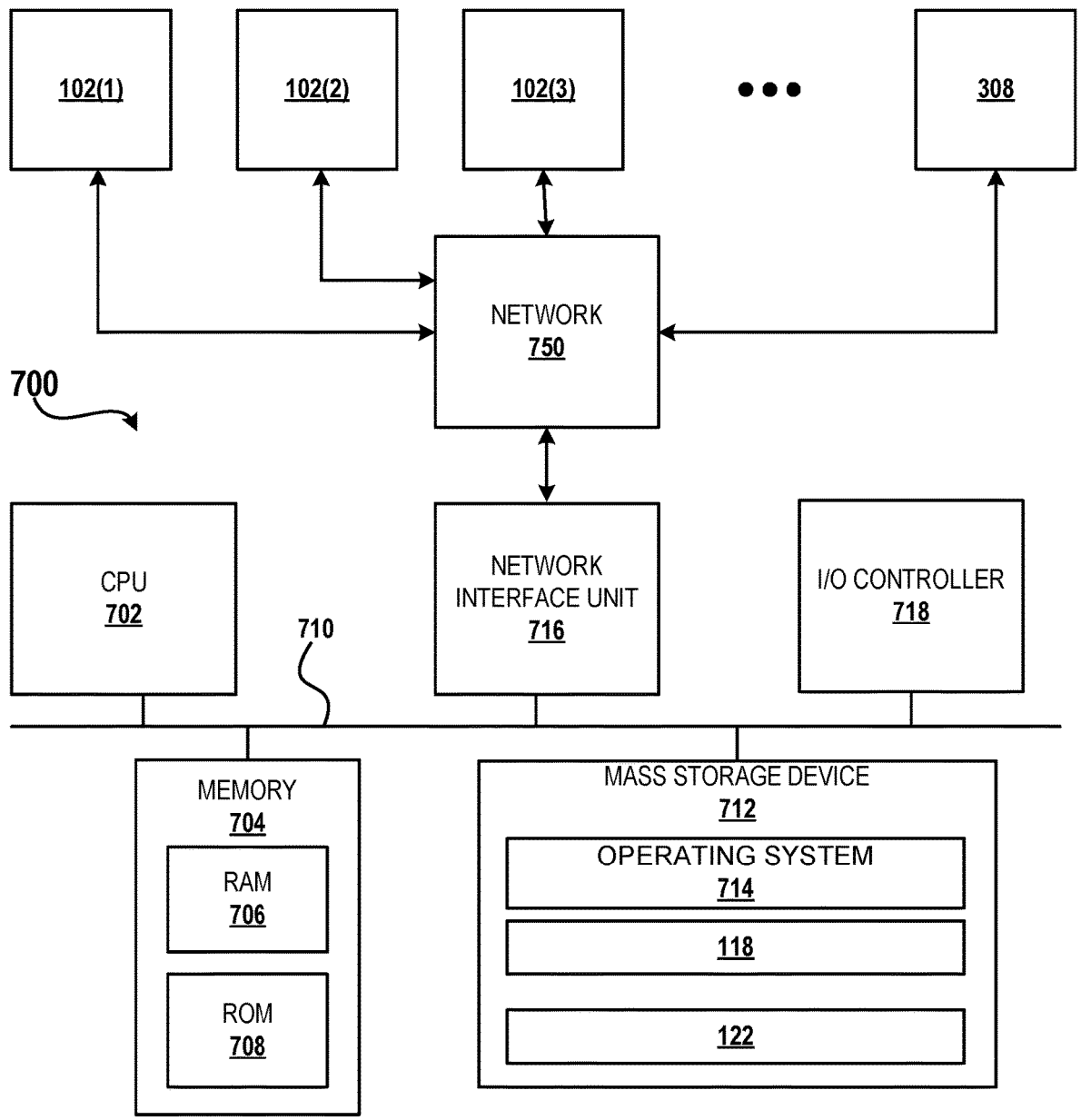
FIG. 7 shows additional details of an example computer architecture for a computer capable of executing the techniques described herein.

FIG. 7 shows additional details of an example computer architecture 700 for a computer capable of executing the techniques described herein. The computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between input controls within the computer architecture 700, such as during startup, is stored in the ROM 708. The computer architecture 700 further includes a mass storage device 712 for storing an operating system 714, other data, and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit input controls, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware input controls constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit input controls constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

Example Clause 1. A computer-implemented method, the method comprising: receiving a corpus that includes at least: first enterprise data that is stored within at least one first enterprise computing resource that is operating within a first region, and second enterprise data that is stored within at least one second enterprise computing resource that is operating within a second region; inputting the corpus into a machine learning (ML) model that is configured to output data extracts corresponding to a plurality of topics; receiving, from the ML model, an output that includes at least: first data extracts that are extracted from the first enterprise data, and second data extracts that are extracted from the second enterprise data; generating, based on the output, a knowledge base (KB) state that defines references between a particular topic and at least: a first KB shard that is generated based on the first data extracts, and a second KB shard that is generated based on the second data extracts; causing the first KB shard to be stored within the at least one first enterprise computing resource; and causing the second KB shard to be stored within the at least one second enterprise computing resource.

Example Clause 2. The computer-implemented method of Example Clause 1, further comprising: generating a site-region map that includes at least: an association between the first KB shard and a first data object from which first information in the first KB shard was extracted by the ML model, and an indication that the first data object is stored within the at least one first enterprise computing resource that is operating within the first region.

Example Clause 3. The computer-implemented method of Example Clause 2, further comprising: detecting a migration of the first data object from the at least one first enterprise computing resource that is operating within the first region to at least one third enterprise computing resource that is operating within a third region; responsive to the migration: causing the first KB shard to be stored within the at least one third enterprise computing resource that is operating within the third region; and updating a topic-region map to indicate that the first data object is stored within the at least one third enterprise computing resource that is operating within the third region.

Example Clause 4. The computer-implemented method of Example Clause 1, further comprising: providing the KB state to at least one serving platform that is configured to surface the particular topic by reconstituting the first KB shard, that is stored within the at least one first enterprise computing resource, and the second KB shard that is stored within the at least one second enterprise computing resource.

Example Clause 5. The computer-implemented method of Example Clause 4, wherein the at least one serving platform is operating within the first region, and wherein the at least one serving platform is further configured to transmit a region-specific query to the at least one second enterprise computing resource to request the second KB shard.

Example Clause 6. The computer-implemented method of Example Clause 1, wherein: the first KB shard is not stored in the at least one second enterprise computing resource; and the second KB shard is not stored in the at least one first enterprise computing resource.

Example Clause 7. The computer-implemented method of Example Clause 1, further comprising: receiving, at the first region, a request that corresponds to the particular topic from a client device; in response to the request, transmitting a region-specific query to the at least one second enterprise computing resource to request the second KB shard; receiving, at the first region, the second KB shard from the at least one second enterprise computing resource; and reconstituting, at the first region, the first KB shard and the second KB shard into the particular topic.

Example Clause 8. A system comprising: one or more processors; and at least one computer storage medium having computer executable instructions stored thereon which, when executed by the one or more processors, cause the system to: receive a corpus that includes at least: first enterprise data that is stored within at least one first enterprise computing resource that is operating within a first region, and second enterprise data that is stored within at least one second enterprise computing resource that is operating within a second region; input the corpus into a machine learning (ML) model that is configured to output data extracts corresponding to a plurality of topics; generate, based on the output, a knowledge base (KB) state that defines references between a particular topic and at least: a first KB shard, and a second KB shard; cause the first KB shard to be stored within the at least one first enterprise computing resource; and cause the second KB shard to be stored within the at least one second enterprise computing resource.

Example Clause 9. The system of Example Clause 8, wherein the computer executable instructions further cause the system to: generate a site-region map that includes at least: an association between the first KB shard and a first data object from which first information in the first KB shard was extracted by the ML model, and an indication that the first data object is stored within the at least one first enterprise computing resource that is operating within the first region.

Example Clause 10. The system of Example Clause 9, wherein the computer executable instructions further cause the system to: detect a migration of the first data object from the at least one first enterprise computing resource that is operating within the first region to at least one third enterprise computing resource that is operating within a third region; responsive to the migration: cause the first KB shard to be stored within the at least one third enterprise computing resource that is operating within the third region; and update a topic-region map to indicate that the first data object is stored within the at least one third enterprise computing resource that is operating within the third region.

Example Clause 11. The system of Example Clause 8, wherein the computer executable instructions further cause the system to: provide the KB state to at least one serving platform that is configured to surface the particular topic by reconstituting the first KB shard, that is stored within the at least one first enterprise computing resource, and the second KB shard that is stored within the at least one second enterprise computing resource.

Example Clause 12. The system of Example Clause 11, wherein the at least one serving platform is operating within the first region, and wherein the at least one serving platform is further configured to transmit a region-specific query to the at least one second enterprise computing resource to request the second KB.

Example Clause 13. The system of Example Clause 8, wherein the computer executable instructions further cause the system to: receive, from the ML model, an output that includes at least: first data extracts that are extracted from the first enterprise data, and second data extracts that are extracted from the second enterprise data, wherein: the first KB shard is generated based on the first data extracts, and the second KB shard is generated based on the second data extracts.

Example Clause 14. The system of Example Clause 8, wherein the computer executable instructions further cause the system to: receive, at the first region, a request that corresponds to the particular topic from a client device; in response to the request, transmit a region-specific query to the at least one second enterprise computing resource to request the second KB shard; receiving, at the first region, the second KB shard from the at least one second enterprise computing resource; and reconstituting, at the first region, the first KB shard and the second KB shard into the particular topic.

Example Clause 15. A computer-readable storage medium storing instructions that, when executed by at least one hardware processor of a device, cause the device to perform operations comprising: receiving a corpus that includes at least: first enterprise data that is stored within at least one first enterprise computing resource that is operating within a first region, and second enterprise data that is stored within at least one second enterprise computing resource that is operating within a second region; inputting the corpus into a machine learning (ML) model that is configured to output data extracts corresponding to a plurality of topics; generating, based on the data extracts, a knowledge base (KB) state that defines references between a particular topic and at least: a first KB shard that is generated based on the first enterprise data, and a second KB shard that is generated based on the second enterprise data; causing the first KB shard to be stored within the at least one first enterprise computing resource; and causing the second KB shard to be stored within the at least one second enterprise computing resource.

Example Clause 16. The computer-readable storage medium of Example Clause 15, wherein the operations further comprise: generating a site-region map that includes at least: an association between the first KB shard and a first data object from which first information in the first KB shard was extracted by the ML model, and an indication that the first data object is stored within the at least one first enterprise computing resource that is operating within the first region.

Example Clause 17. The computer-readable storage medium of Example Clause 16, wherein the operations further comprise: detecting a migration of the first data object from the at least one first enterprise computing resource that is operating within the first region to at least one third enterprise computing resource that is operating within a third region; responsive to the migration: causing the first KB shard to be stored within the at least one third enterprise computing resource that is operating within the third region; and updating a topic-region map to indicate that the first data object is stored within the at least one third enterprise computing resource that is operating within the third region.

Example Clause 18. The computer-readable storage medium of Example Clause 15, wherein the operations further comprise: receiving, from the ML model, an output that includes at least: first data extracts that are extracted from the first enterprise data, and second data extracts that are extracted from the second enterprise data, wherein: the first KB shard is generated based on the first data extracts, and the second KB shard is generated based on the second data extracts.

Example Clause 19. The computer-readable storage medium of Example Clause 15, wherein the operations further comprise: providing the KB state to at least one serving platform that is configured to surface the particular topic by reconstituting the first KB shard, that is stored within the at least one first enterprise computing resource, and the second KB shard that is stored within the at least one second enterprise computing resource.

Example Clause 20. The computer-readable storage medium of Example Clause 15, wherein the at least one serving platform is operating within the first region, and wherein the at least one serving platform is further configured to transmit a region-specific query to the at least one second enterprise computing resource to request the second KB shard.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A computer-implemented method, the method comprising:
receiving a corpus that includes at least: first enterprise data that is stored within at least one first enterprise computing resource that is operating within a first region, and second enterprise data that is stored within at least one second enterprise computing resource that is operating within a second region;

inputting the corpus into a machine learning (ML) model that is configured to output data extracts corresponding to a plurality of topics;

receiving, from the ML model, an output that includes at least: first data extracts that are extracted from the first enterprise data, and second data extracts that are extracted from the second enterprise data;

generating, based on the output, a knowledge base (KB) state that defines references between a particular topic and at least: a first KB shard that is generated based on the first data extracts, and a second KB shard that is generated based on the second data extracts;

causing the first KB shard to be stored within the at least one first enterprise computing resource; and causing the second KB shard to be stored within the at least one second enterprise computing resource.

2. The computer-implemented method of claim 1, further comprising:

generating a site-region map that includes at least: an association between the first KB shard and a first data object from which first information in the first KB shard was extracted by the ML model, and an indication that the first data object is stored within the at least one first enterprise computing resource that is operating within the first region.

3. The computer-implemented method of claim 2, further comprising:

detecting a migration of the first data object from the at least one first enterprise computing resource that is operating within the first region to at least one third enterprise computing resource that is operating within a third region;

responsive to the migration:

causing the first KB shard to be stored within the at least one third enterprise computing resource that is operating within the third region; and updating a topic-region map to indicate that the first data object is stored within the at least one third enterprise computing resource that is operating within the third region.

4. The computer-implemented method of claim 1, further comprising:

providing the KB state to at least one serving platform that is configured to surface the particular topic by reconstituting the first KB shard, that is stored within the at least one first enterprise computing resource, and the second KB shard that is stored within the at least one second enterprise computing resource.

5. The computer-implemented method of claim 4, wherein the at least one serving platform is operating within the first region, and wherein the at least one serving platform is further configured to transmit a region-specific query to the at least one second enterprise computing resource to request the second KB shard.

6. The computer-implemented method of claim 1, wherein:

the first KB shard is not stored in the at least one second enterprise computing resource; and the second KB shard is not stored in the at least one first enterprise computing resource.

7. The computer-implemented method of claim 1, further comprising:

receiving, at the first region, a request that corresponds to the particular topic from a client device;

in response to the request, transmitting a region-specific query to the at least one second enterprise computing resource to request the second KB shard;

receiving, at the first region, the second KB shard from the at least one second enterprise computing resource; and reconstituting, at the first region, the first KB shard and the second KB shard into the particular topic.

8. A system comprising:

one or more processors; and at least one computer storage medium having computer executable instructions stored thereon which, when executed by the one or more processors, cause the system to:

receive a corpus that includes at least: first enterprise data that is stored within at least one first enterprise computing resource that is operating within a first region, and second enterprise data that is stored within at least one second enterprise computing resource that is operating within a second region;

input the corpus into a machine learning (ML) model that is configured to output data extracts corresponding to a plurality of topics;

generate, based on the output, a knowledge base (KB) state that defines references between a particular topic and at least: a first KB shard, and a second KB shard;

cause the first KB shard to be stored within the at least one first enterprise computing resource; and cause the second KB shard to be stored within the at least one second enterprise computing resource.

9. The system of claim 8, wherein the computer executable instructions further cause the system to:

generate a site-region map that includes at least: an association between the first KB shard and a first data object from which first information in the first KB shard was extracted by the ML model, and an indication that the first data object is stored within the at least one first enterprise computing resource that is operating within the first region.

10. The system of claim 9, wherein the computer executable instructions further cause the system to:

detect a migration of the first data object from the at least one first enterprise computing resource that is operating within the first region to at least one third enterprise computing resource that is operating within a third region;

responsive to the migration:

cause the first KB shard to be stored within the at least one third enterprise computing resource that is operating within the third region; and update a topic-region map to indicate that the first data object is stored within the at least one third enterprise computing resource that is operating within the third region.

11. The system of claim 8, wherein the computer executable instructions further cause the system to:

provide the KB state to at least one serving platform that is configured to surface the particular topic by reconstituting the first KB shard, that is stored within the at least one first enterprise computing resource, and the second KB shard that is stored within the at least one second enterprise computing resource.

12. The system of claim 11, wherein the at least one serving platform is operating within the first region, and wherein the at least one serving platform is further configured to transmit a region-specific query to the at least one second enterprise computing resource to request the second KB.

13. The system of claim 8, wherein the computer executable instructions further cause the system to:

receive, from the ML model, an output that includes at least: first data extracts that are extracted from the first enterprise data, and second data extracts that are extracted from the second enterprise data, wherein:

the first KB shard is generated based on the first data extracts, and the second KB shard is generated based on the second data extracts.

14. The system of claim 8, wherein the computer executable instructions further cause the system to:

receive, at the first region, a request that corresponds to the particular topic from a client device;

in response to the request, transmit a region-specific query to the at least one second enterprise computing resource to request the second KB shard;

receiving, at the first region, the second KB shard from the at least one second enterprise computing resource; and reconstituting, at the first region, the first KB shard and the second KB shard into the particular topic.

15. A computer-readable storage medium storing instructions that, when executed by at least one hardware processor of a device, cause the device to perform operations comprising:

receiving a corpus that includes at least: first enterprise data that is stored within at least one first enterprise computing resource that is operating within a first region, and second enterprise data that is stored within at least one second enterprise computing resource that is operating within a second region;

inputting the corpus into a machine learning (ML) model that is configured to output data extracts corresponding to a plurality of topics;

generating, based on the data extracts, a knowledge base (KB) state that defines references between a particular topic and at least: a first KB shard that is generated based on the first enterprise data, and a second KB shard that is generated based on the second enterprise data;

causing the first KB shard to be stored within the at least one first enterprise computing resource; and causing the second KB shard to be stored within the at least one second enterprise computing resource.

16. The computer-readable storage medium of claim 15, wherein the operations further comprise:

generating a site-region map that includes at least: an association between the first KB shard and a first data object from which first information in the first KB shard was extracted by the ML model, and an indication that the first data object is stored within the at least one first enterprise computing resource that is operating within the first region.

17. The computer-readable storage medium of claim 16, wherein the operations further comprise:

detecting a migration of the first data object from the at least one first enterprise computing resource that is operating within the first region to at least one third enterprise computing resource that is operating within a third region;

responsive to the migration:

causing the first KB shard to be stored within the at least one third enterprise computing resource that is operating within the third region; and updating a topic-region map to indicate that the first data object is stored within the at least one third enterprise computing resource that is operating within the third region.

18. The computer-readable storage medium of claim 15, wherein the operations further comprise:

receiving, from the ML model, an output that includes at least: first data extracts that are extracted from the first enterprise data, and second data extracts that are extracted from the second enterprise data, wherein:

the first KB shard is generated based on the first data extracts, and the second KB shard is generated based on the second data extracts.

19. The computer-readable storage medium of claim 15, wherein the operations further comprise:

providing the KB state to at least one serving platform that is configured to surface the particular topic by reconstituting the first KB shard, that is stored within the at least one first enterprise computing resource, and the second KB shard that is stored within the at least one second enterprise computing resource.

20. The computer-readable storage medium of claim 15, wherein the at least one serving platform is operating within the first region, and wherein the at least one serving platform is further configured to transmit a region-specific query to the at least one second enterprise computing resource to request the second KB shard.

* * * * *